May 5, 1942.  P. H. ODESSEY  2,281,593
VOLTAGE REGULATOR
Filed May 26, 1938  2 Sheets-Sheet 1

Inventor
Paul H. Odessey,
By Ralph B. Stewart
Attorney

May 5, 1942.  P. H. ODESSEY  2,281,593
VOLTAGE REGULATOR
Filed May 26, 1938   2 Sheets-Sheet 2
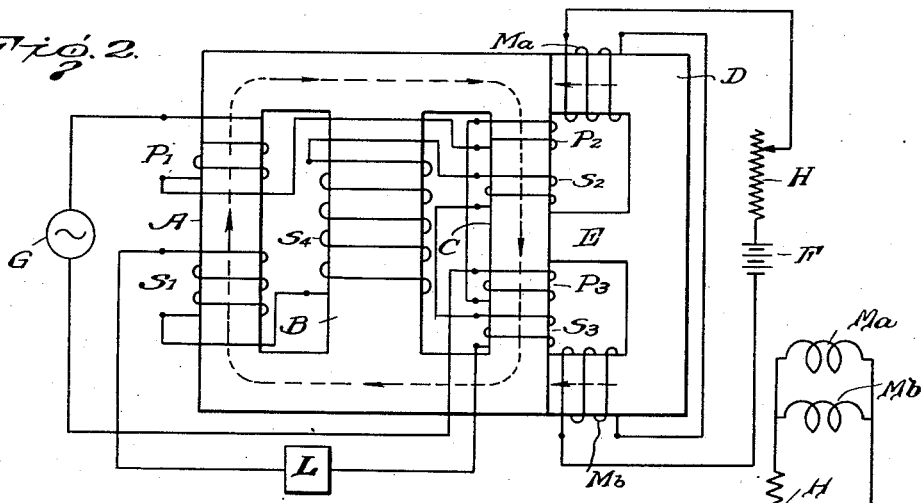
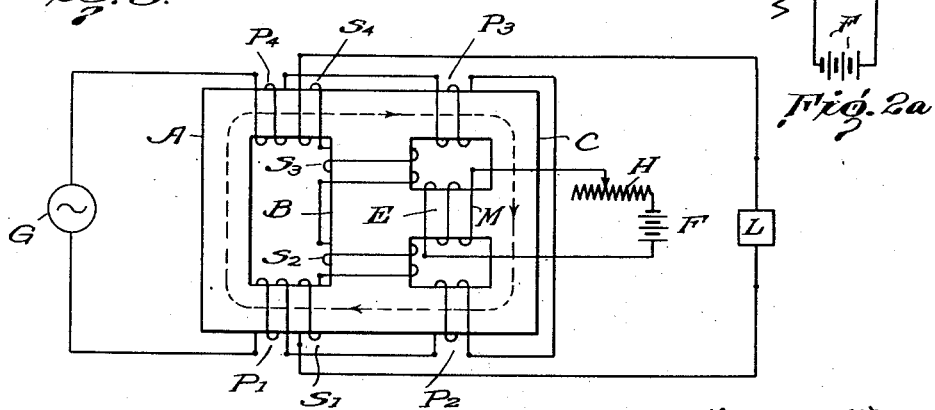
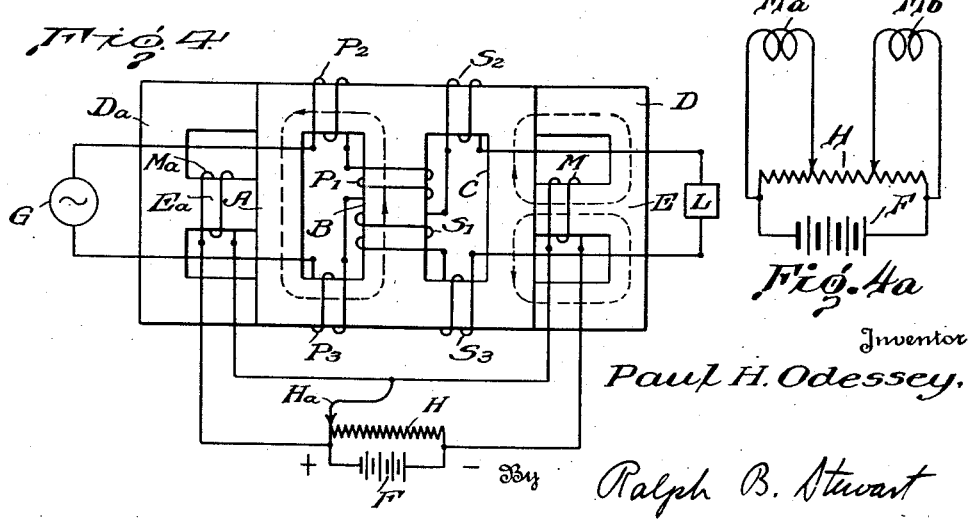
Inventor
Paul H. Odessey,
By Ralph B. Stewart
Attorney Patented May 5, 1942

2,281,593

UNITED STATES PATENT OFFICE 2,281,593

VOLTAGE REGULATOR

Paul H. Odessey, Brooklyn, N. Y.

Application May 26, 1938, Serial No. 210,261

14 Claims. (Cl. 171—119)

My invention relates to voltage regulators and in particular to regulators of the static-transformer type in which a variable output voltage is obtained by varying the saturation of a portion of the magnetic circuit of the transformer.

My invention is useful as a source of variable voltage subject to manual control or it may be incorporated in various regulator systems for automatically regulating the voltage of an alternating current supply.

An object of the invention is to devise a voltage regulator in which a smooth and continuous variation of an alternating current voltage is obtained without appreciable distortion of the wave form. One feature of the present invention is the proper distribution of the primary and secondary winding to reduce magnetic leakage between the windings and thereby avoid appreciable wave form distortion from this source and improve its load characteristic. Another feature is the arrangement of the saturating winding to give symmetrical saturation of a portion of the magnetic path and thereby avoid distortion of wave form due to direct superposition of the alternating current and direct current fields. According to my invention, the primary winding is distributed over different portions of the transformer core and one portion of the core carrying a part of the primary winding is symmetrically saturated to thereby effectively decrease the number of primary turns without actually removing any turns from the primary circuit. In certain forms of my invention, the secondary winding is so arranged on the core that, in addition to the action described above, the saturation of a portion of the core also results in an effective increase (or decrease) in the number of secondary turns.

A further object is to devise a highly sensitive voltage regulator in which substantial voltage changes are obtained by small variations of magnetizing current supplied to the saturating circuit.

Further objects and advantages of my invention will be apparent from the description of the invention given below and from an article written by me and published in Electrical Engineering for September 1936.

In the accompanying drawings,

Figure 1 is a schematic diagram showing one arrangement of my invention;

Figures 1a to 1h, inclusive, 1i and 1k are schematic circuit diagrams illustrating possible variations in connections of the transformer windings;

Figure 2 illustrates a modification of the arrangement shown in Figure 1; Figure 2a shows an alternative connection for magnetizing windings Ma and Mb of Figure 2.

Figure 3 illustrates a third form of my invention, and

Figure 4 illustrates another form of the invention employing saturating windings on two different portions of the transformer core. Figure 4a shows an alternative arrangement for energizing magnetizing windings Ma and Mb of Figure 4.

The transformer of the regulator is provided with a magnetic core having three legs A, B and C arranged in the usual form of a "shell-type" transformer core. A fourth leg D is arranged in parallel with one of the outer legs of the transformer core, and a magnetic bridge E connects points of equal magnetic potential on legs C and D. Core leg A carries windings P1 and S1, leg B carries winding S4, and leg C carries windings P3, P2 and S2 and S3. Preferably magnetic bridge E is joined at the midpoint of legs C and D, and windings P2 and P3 are identical, and windings S2 and S3 are identical. A magnetizing winding M is mounted upon the magnetic bridge E joining legs C and D.

Figure 1:
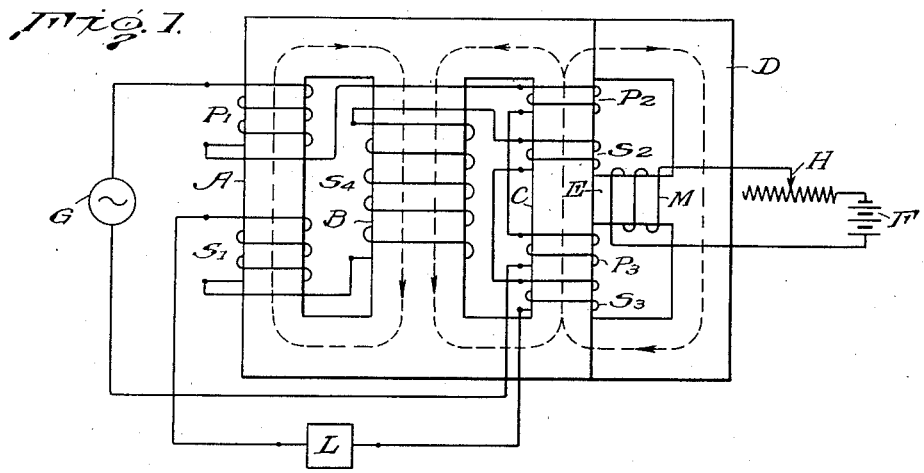

Various connections of the windings of Figure 1 are possible. In the arrangement shown in Figure 1 the windings P1, P2 and P3 are connected in a primary circuit to a suitable source of alternating current represented at G, the coils being connected in a direction to establish magnetic flux lines in the directions indicated by the dotted lines in core legs A, B, C and D. Windings S1, S4, S2 and S3, are connected in series aiding relation to form a secondary circuit for supplying a suitable load represented at L. Winding M is supplied with a variable magnetizing current from a suitable source represented by battery F and variable resistance H.

When magnetizing winding M is de-energized, the primary windings establish magnetic lines as shown in Figure 1, and a certain amount of magnetic lines from leg C also traverse the leg D. Under this condition, a voltage is induced in each of the secondary windings S1, S2, S3 and S4, and since these windings are connected in series aiding relation, a certain voltage will be impressed upon the load L. Upon energizing the winding M, legs C and D will be traversed by magnetic lines set up by the coil M, and these lines will flow in one direction in the upper part of leg C and in the opposite direction in the lower part of leg C, thus tending to saturate leg C. The saturating flux is applied to the leg in a symmetrical relation to the alternating current flux linking legs B and C. This arrangement prevents distortion of the magnetizing current in the primary circuit, and thereby avoids distortion of the wave form of the voltage induced in the secondary windings due to unequal saturation on the two half-cycles. This arrangement also prevents direct current flux from flowing in legs A and B, and it prevents the possibility of alternating currents of fundamental frequency being induced in magnetizing winding M.

Due to the saturation of leg C, the amount of alternating current flux in leg C is reduced, thereby reducing the countervoltage of primary windings P2 and P3, and thus causing a greater voltage to be impressed across primary winding P1. Since this action is equivalent to a reduction in the number of primary turns, the alternating current flux must increase, and the increase must take place in the alternating current flux linking legs A and B. The voltage induced in windings S2 and S3 will decrease with increase in saturation of leg C, but the voltage induced in winding S1 will increase.

The amount of voltage induced in winding S4 is substantially unaffected by saturation of leg C, since the total flux in leg B remains substantially the same. If the ratio between the number of turns in winding S1 to the combined turns in windings S2 and S3 is greater than the ratio between the number of turns in winding P1 to the combined turns of windings P2 and P3, then there will be a resulting increase in output voltage with increasing saturation. In other words, if $$\frac{NS1}{NS2+NS3}$$

is greater than $$\frac{NP1}{NP2+NP3}$$

the output voltage will increase with increased saturation, N representing the number of turns in each coil. If $$\frac{NS1}{NS2+NS3}$$

is less than $$\frac{NP1}{NP2+NP3}$$

the output voltage will decrease with saturation. The winding S4 may be included in the circuit either in aiding or opposing relation, and serves mainly to fix the normal or unsaturated voltage of the load circuit. This winding may be omitted entirely as will be further explained hereinafter.

It is clear that by supplying a variable magnetizing current to winding M, either by varying the resistance H or from any other suitable source, the output voltage of the transformer will vary. Figure 7 of my paper in Electrical Engineering shows how the secondary voltage varies with increasing magnetising current in a transformer connected according to the arrangement illustrated in Figure 1 of this application, and in which winding P1 was formed of 400 turns, windings S1 and S4 600 turns each, and windings P2, P3, S2 and S3 of 200 turns each, core legs A and C having the same cross-sectional area, and core leg B having twice the cross-sectional area as leg A. The oscillograms shown in Figure 9 represent the voltage and current waves for the same transformer.

Figure 1A:
Figure 1:
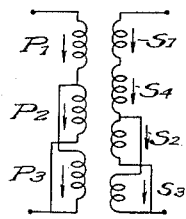

Instead of connecting windings P2 and P3 in series relation, these windings may be connected in parallel as shown in Figure 1a, and secondary windings S2 and S3 may also be connected in parallel as shown in this figure. The parallel connections of these windings avoids any disturbance from double-frequency currents induced in these windings due to the saturation effects.

Figure 1B:
Figure 1:
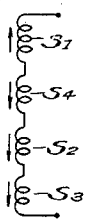
Figures 1C, 1D:
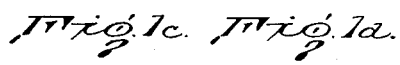
Figure 1:
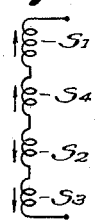
Figure 1E:
Figure 1:
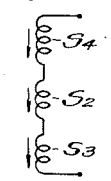
Figure 1F:
Figure 1:
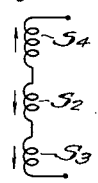
Figures 1G, 1H:
Figure 1:
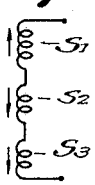
Figure 1I:
Figure 1:
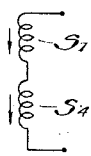
Figure 1K:
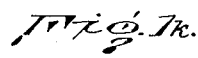
Figure 1:
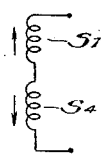

Various circuit connections are possible with the arrangement shown in Figure 1, and a number of different connections for the secondary windings are shown in Figures 1b to 1h inclusive. In all of these figures, the arrows indicate the poling of the various windings, arrows pointing in the same direction indicating aiding relation, while arrows pointing in opposite directions indicate opposing relation. In Figure 1b winding S1 is connected in opposing relation to windings S2, S3 and S4. In Figure 1c, winding S4 is connected in opposing relation to windings S1, S2 and S3. In Figure 1d windings S1 and S4 are connected in aiding relation to each other but in opposing relation to windings S2 and S3. In Figures 1e and 1f, winding S1 is not used, and in Figure 1e winding S4 is in aiding relation to windings S1 and S2, while in Figure 1f it is in opposing relation. In Figure 1g the secondary circuit includes winding S1, S2 and S3 connected in aiding relation, while in Figure 1h the secondary circuit includes these same windings with winding S1 opposing windings S2 and S3. In the arrangement shown in Figures 1i and 1k, only windings S1 and S4 are included in the secondary circuit in aiding relation in Figure 1i, and in opposing relation in Figure 1k. It is also obvious that the secondary circuit may include only winding S1. From the above description of the action of the various secondary windings, it will be obvious that different types of variation of the secondary voltage may be obtained by different circuit connections. In general, it is possible to obtain variations of the type shown in Figure 10 of my article published in Electrical Engineering for September 1936.

The arrangement shown in Figure 2 involves the same core arrangement as in Figure 1, but the connection of the windings in the primary circuit is such that the primary flux links legs A and C and does not normally pass through leg B. Also, in this figure, I have shown an alternative method of energizing the saturating core D by the use of two magnetizing windings Ma and Mb mounted on the outer legs of the core D instead of the single winding M on the central leg as shown in Figure 1. It will be understood that windings Ma and Mb may be connected either in series as in Figure 2 or in parallel as in Figure 2a and included in the circuit with battery F and variable resistance H. Windings Ma and Mb are so poled that the saturating flux passes through leg C in opposite directions in different halves of the leg.

In the normal or unsaturated condition of Figure 2, no voltage is induced in winding S4, but as leg C becomes saturated, A.-C. flux traverses leg B and an increasing voltage is induced in this winding with increasing saturation, thereby in effect increasing the secondary turns. A voltage is normally induced in winding S1 and this voltage increases with increase in saturation due to the increase in primary flux caused by the effective reduction in the number of primary turns included in the primary circuit. Normally a voltage is induced in windings S2 and S3, but these voltages are decreased with increase in saturation. The same connection combinations are possible in Figure 2 as in Figure 1, but the operation of the different combinations will vary from that of Figure 1 due to the difference in action of winding S4. Also, the winding ratios stated above for Figure 1 are not necessary for Figure 2.

I have made actual tests on several of the different arrangements disclosed herein. In one arrangement in which the primary windings were connected as shown in Figure 2 and the secondary windings were connected in additive series relation, the secondary voltage at no saturation had a value of 125 volts, and upon increasing the saturation the secondary voltage increased to 225 volts at full saturation, the increase in secondary voltage following generally the shape of a saturation curve. In another arrangement, with the same primary winding connection as in Figure 2, the secondary windings connected as in Figure 1c, the secondary voltage at no saturation had a value of 125 volts and with increasing saturation the voltage dropped to a value of approximately 75 volts at full saturation, the decrease in voltage following generally the shape of an inverted saturation curve. In a third arrangement, with the same primary connections of windings, and with a secondary connection according to Figure 1d, the secondary voltage at no saturation was of the order of 15 volts, and upon increase in saturation the secondary voltage increased at first substantially in a straight line relation and then at a slower rate until at full saturation the secondary voltage reached a value of 175 volts. From these examples, and from the above description of operation of the transformer, the operation of the remaining possible connection arrangements will be obvious.

Figure 3 is a modification of the arrangement shown in Figure 2. The transformer core involves three legs A, B and C as before, the leg C being smaller than the leg B as shown, and the magnetic bridge E is connected directly between the legs B and C. Four primary windings P1, P2, P3 and P4 are connected in the primary circuit to the source G to establish a primary flux according to the dotted lines shown in Figure 3, windings P1 and P4 being arranged on leg A while windings P2 and P3 are arranged on leg C. The secondary circuit connected to the load L includes four windings S1, S2, S3 and S4 connected in series aiding relation, windings S1 and S4 being arranged on leg A, while windings S2 and S3 are arranged on leg B. Magnetizing winding M on magnetic bridge E is supplied with a variable magnetizing current from battery F through variable resistance H.

In the unsaturated condition of Figure 3 voltages are induced in secondary windings S1 and S4 but no voltages are induced in windings S2 and S3. Upon energizing magnetizing winding M, leg C becomes symmetrically saturated, but the leg B being larger than leg C is not substantially affected by the saturating flux. Saturation of the leg C reduces the inductance of primary windings P2 and P3 and thus effectively decreases the number of turns in the primary circuit and thereby increases the flux linking legs A and B. This results in voltages being induced in windings S2 and S3 in additive relation to the voltages induced in windings S1 and S4, and the output voltage is further increased by the increase in voltages induced in windings S1 and S4. The load circuit may include only windings S1 and S4, or it may include only windings S2 and S3, but in the latter case the load circuit would not have any impressed voltage at the unsaturated condition of leg C but would have an increasing impressed voltage as saturation is increased.

By connecting windings S2 and S3 of Figure 3 in opposition to windings S1 and S4, the normal output voltage will be the combined induced voltages of S1 and S4. With increasing saturation, the induced voltages in windings S2 and S3 would oppose the voltages induced in S1 and S4 and the output voltage would decrease with increasing saturation. In Figure 3 also, windings P2 and P3 may be connected in parallel as well as windings S2 and S3.

The arrangement shown in Figure 4 involves the same core arrangement as employed in Figures 1 and 2 with the addition of a fifth leg Da arranged in parallel with the leg A and having a magnetic bridge Ea. In this arrangement, windings P1 and S1 are arranged on core B. Windings P2 and P3 are arranged on the yoke section of the core to link the flux flowing through leg A, and these windings could be arranged directly on leg A on opposite sides of bridge Ea. Windings S2 and S3 are positioned on the yoke section of the core to link the flux passing through leg C, and these windings could be arranged directly on leg C on opposite sides of magnetic bridge E. I prefer to arrange windings P2, P3, S2 and S3 on the yoke of the core adjacent leg B as shown in Figure 4 in order to reduce the magnetic leakage between these windings and the windings on leg B. This arrangement also avoids appreciable leakage of alternating flux through legs D and Da. The primary circuit connected to the source G includes windings P1, P2 and P3 connected in series aiding relation to establish the primary flux as shown in dotted lines. The secondary circuit connected to load L includes windings S1, S2 and S3 connected in series aiding relation. Normally winding M is saturated by current supplied from source F through variable contact Ha on resistance H connected in parallel with battery F. Winding Ma is also connected to battery F so that it is normally short-circuited by contact Ha, but upon shifting contact Ha to the right, winding Ma is energized and winding M is short-circuited by contact Ha. Any other suitable arrangement for shifting saturation from winding M to winding Ma, and vice versa, may be employed.

Under normal conditions of Figure 4, the winding M is excited and winding Ma unexcited, thus causing practically all the primary flux to link only secondary coil S1 since leg C is a high reluctance path. Under normal conditions, leakage reactance of both primary and secondary is reduced, since the magnetic circuit is confined practically to legs A and B. The secondary voltage, because of this condition, is practically sinusoidal. Further, since leg C is saturated, coils S2 and S3 contribute no voltage to the total secondary voltage which in effect is given by $$E_s = \frac{N_{s1}}{N_{p1} + N_{p2} + N_{p3}} E_p \text{ (const.)}$$

Np, Ns are primary and secondary turns respectively.

If now, the excitation is removed from winding M and applied to winding Ma by shifting contact Ha to the right, then leg A becomes saturated and leg C becomes unsaturated or normal. Thus, the inductance of primary coils P2 and P3 is greatly reduced and the total applied primary voltage is impressed on coil P1 which causes an increase in A.-C. flux. As a consequence of increased magnetic reluctance of leg A, the distribution of A.-C. flux is altered and confined to legs B and C. Under this condition the secondary voltage is increased because of increased A.-C. flux linkage of coil S1, and increased further because of additional A.-C. flux linkages of S2 and S3 which now contribute to the total secondary induced voltage. Hence $$E_s = \frac{N_{s1} + N_{s2} + N_{s3}}{N_{p1}} E_p \text{ (const.)}$$

As before, leakage reactance is minimum and the wave shape of the secondary voltage is practically unchanged.

Separate controls may be provided for each of windings M and Ma as shown in Figure 4a instead of the single control shown in Figure 4. Also, the secondary circuit may include only winding SI, and the primary circuit may include only winding PI.

It will be seen that all forms of my invention embody a ladder type of core having at least three legs or transverse arms. The arrangement of Figure 3 employs only three legs, Figures 1 and 2 four legs, and Figure 4 five legs. No primary or secondary windings are carried by saturating legs D and Da, but windings could be arranged on these legs if desired.

What I claim is:

1. In combination, a unitary transformer core comprising at least three legs arranged to provide at least three magnetic paths connected in parallel relation, a primary circuit including windings linking the magnetic paths of at least two of said legs for establishing a primary flux in said legs, said windings being arranged in serial circuit relation, and means to variably saturate one of the legs having a primary winding linked therewith to thereby vary the effective number of turns in said primary circuit, said variable saturating means comprising means to establish magnetizing fluxes in opposite directions in different linear sections of said saturated leg, and including return paths for said fluxes separate from the other two legs of said core.

2. A combination according to claim 1 wherein a secondary winding is linked with one of the legs of the transformer core having a primary winding linked therewith.

3. In combination, a unitary transformer core comprising three legs arranged to provide at least three magnetic paths connected in parallel relation, a primary circuit including serially connected windings arranged to link the individual magnetic paths of at least two of said legs for establishing a magnetic flux linking said two legs with the third leg, means to establish direct current magnetizing fluxes in opposite directions in different linear sections of one of said legs provided with primary windings, said means including return paths for said magnetizing fluxes separate from the other two legs of said core.

4. In combination, a transformer core comprising three legs arranged in parallel relation, a primary circuit including serially connected windings arranged to link the individual magnetic paths of at least two of said legs for establishing a magnetic flux linking said two legs without linking the third, and means to symmetrically saturate one of said two legs whereby the magnetic flux flowing in the other of said two legs is caused to traverse the third leg.

5. A combination according to claim 4 wherein a secondary circuit is provided and includes a winding linking the third core leg.

6. In combination, a unitary transformer core comprising two outer legs and a center leg forming three magnetic paths connected in parallel relation, a primary circuit including serially connected windings arranged to link the individual magnetic paths of each of said outer legs, means to saturate one of said outer legs without saturating the other outer leg and without saturating the center leg, whereby increased flux linkage is obtained between the other outer leg and the center leg, and a secondary circuit including a winding linking the path of increased flux linkage.

7. In combination, a transformer core comprising two outer legs and a center leg, a primary circuit including serially connected windings arranged on each of said outer legs, a secondary circuit including serially connected windings on each of said outer legs, the secondary turns carried by said first leg comprising a different proportion of the total secondary turns than the proportion of primary turns on the first leg to the total primary turns, and means to saturate one of said outer legs.

8. In combination, a transformer core comprising four parallel legs, a transverse magnetic bridge connected between the third and fourth legs, a primary circuit including serially connected windings arranged on the first and third legs, means to symmetrically saturate said third and fourth legs through said magnetic bridge, and a secondary circuit including a winding linking said first leg.

9. In combination, a ladder type magnetic core having four parallel legs, a transverse magnetic bridge connected between the third and fourth legs, a primary circuit including a winding on the first leg serially connected with two windings on the third leg and on opposite sides of said bridge, and means to symmetrically saturate said third leg through said magnetic bridge.

10. The combination according to claim 9 and including a secondary circuit having a winding on the second leg.

11. The combination according to claim 9 and including a secondary circuit comprising a winding on the first leg serially connected with two windings on the third leg arranged on opposite sides of said bridge.

12. In combination, a transformer core having a center leg and two outer legs, a primary circuit including a winding on one outer leg and a winding on the center leg, a secondary circuit including a winding on the other outer leg, means for saturating said outer legs including a saturating winding for each leg, a source of current for said saturating windings, and control means for varying in opposite directions the amount of current supplied to said saturating windings.

13. In combination, a transformer core having a center leg and two outer legs, a primary circuit including a winding on said center leg and a winding on one outer leg, a secondary circuit including a winding on said center leg and a winding on the other outer leg, means for saturating said outer legs including a saturating winding for each leg, a source of current for said saturating windings, and control means for varying in opposite directions the amount of current supplied to said saturating windings.

14. In combination, a transformer core having a center leg and two outer legs, a primary circuit including a winding on said center leg and windings on the yoke portions connecting the center leg with one of said outer legs, a secondary circuit including a winding on said center leg and windings on the yoke portions of said core connecting the center leg with the other outer leg, and individual means for variably saturating each of said outer legs comprising means to establish magnetizing fluxes in opposite directions in different linear sections of each of said outer legs.

PAUL H. ODESSEY.